(Model.)

W. D. ELWELL.
LID FOR POTS, KETTLES, &c.

No. 283,227. Patented Aug. 14, 1883.

Witnesses.
Edwin L. Yewee
J. J. McCarthy

Inventor.
W. D. Elwell,
By C. A. Alexander
Attorney.

UNITED STATES PATENT OFFICE.

WILLIAM D. ELWELL, OF ROMEO, MICHIGAN.

LID FOR POTS, KETTLES, &c.

SPECIFICATION forming part of Letters Patent No. 283,227, dated August 14, 1883.

Application filed June 5, 1883. (Model.)

*To all whom it may concern:*

Be it known that I, WILLIAM D. ELWELL, a citizen of the United States, residing at Romeo, in the county of Macomb and State of Michigan, have invented certain new and useful Improvements in Lids for Pots and Kettles, of which the following is a specification, reference being had therein to the accompanying drawings.

This invention relates to certain improvements in covers for pots, kettles, and other like articles; and it has for its objects to provide a cover that may be readily attached and detached, as more fully hereinafter specified. This object I attain by the means illustrated in the accompanying drawings, in which—

Figure 1:
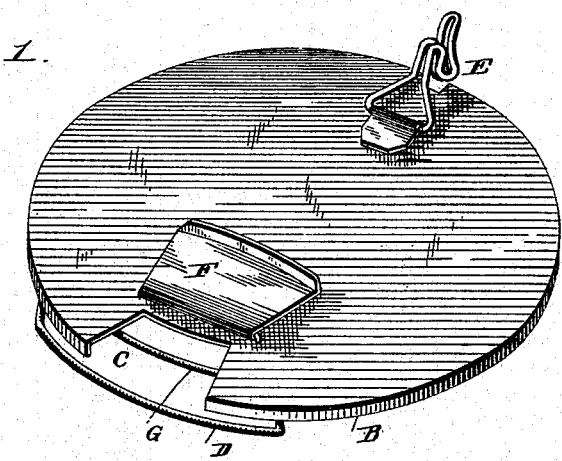
Figure 2:
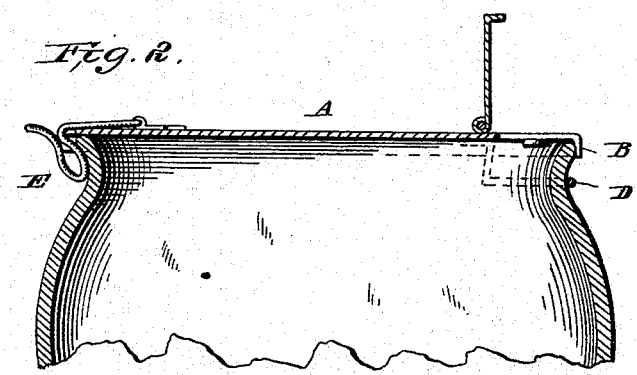

Figure 1 represents a perspective view of my improved device, and Fig. 2 a cross-section showing the same applied to the top of the pot.

The letter A indicates a circular metallic disk, of a size suitable to fit upon the top of the pot or kettle. The said disk is provided with a downwardly-turned cover or flange, B, at its edge, which sets over the top of the pot or kettle when the cover is in place. At one side the disk is cut away, as indicated by the letter C, forming an opening when the cover is in place, through which liquid contents may be discharged.

The letter D indicates a curved wire frame attached to the under or upper side of the cover at one edge, which is adapted to set under the rim at the top of the pot or kettle, as indicated in Fig. 2 of the drawings. To the opposite side of the lid or cover is hinged a spring-clasp, E, which is adapted to be turned down under the rim to lock the lid in place.

The letter F indicates a hinged cover or flap attached to the disk A, which is adapted to close the opening when desired.

The letter G indicates a wire extending across the opening, which prevents solid contents from passing out when the pot or kettle is drained. Several of these wires may be employed, or a strainer may be used in their place.

Having thus described my invention, what I claim, and desire to secure by Letters Patent, is—

A cover for pots, kettles, and other like vessels, consisting of a circular flanged disk having a portion cut away, and provided with a curved wire spring adapted to fit under the rim of the pot or kettle, and a hinged spring-clasp adapted to be turned under the rim, the disk being cut away at one side and provided with a hinged plate to cover the opening, substantially as specified.

In testimony whereof I affix my signature in presence of two witnesses.

WILLIAM D. ELWELL.

Witnesses:
GEORGE B. CHIPCHASE,
WILLIAM J. WELLSTEAD.